(12) United States Patent
Soares Luis et al.

(10) Patent No.: US 11,088,777 B2
(45) Date of Patent: Aug. 10, 2021

(54) POLARIZATION DIVISION MULTIPLEXING INTENSITY MODULATION SYSTEM AND METHOD USING THE SYSTEM

(71) Applicant: NATIONAL INSTITUTE OF INFORMATION AND COMMUNICATIONS TECHNOLOGY, Koganei (JP)

(72) Inventors: Ruben Soares Luis, Koganei (JP); Georg Friedrich Rademacher, Koganei (JP); Ben Puttnam, Koganei (JP); Satoshi Shinada, Koganei (JP); Naoya Wada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 16/966,455

(22) PCT Filed: Jan. 31, 2018

(86) PCT No.: PCT/JP2018/003280
§ 371 (c)(1),
(2) Date: Jul. 30, 2020

(87) PCT Pub. No.: WO2019/150509
PCT Pub. Date: Aug. 8, 2019

(65) Prior Publication Data
US 2021/0036798 A1 Feb. 4, 2021

(51) Int. Cl.
*H04B 10/00* (2013.01)
*H04J 14/06* (2006.01)
(Continued)

(52) U.S. Cl.
CPC ............ *H04J 14/06* (2013.01); *H04B 10/516* (2013.01); *H04B 10/66* (2013.01)

(58) Field of Classification Search
CPC ....... H04J 14/06; H04B 10/50; H04B 10/505; H04B 10/60; H04B 10/66
See application file for complete search history.

(56) References Cited

U.S. PATENT DOCUMENTS

| 2012/0076507 A1 | 3/2012 | Roberts et al. |
| 2014/0369698 A1 | 12/2014 | Wu et al. |
| 2018/0212709 A1* | 7/2018 | Lee .................... H04B 10/6166 |

OTHER PUBLICATIONS

International Search Report of International Patent Application No. PCT/JP2018/003280 completed Apr. 10, 2018 and dated Apr. 24, 2018 (1 page).

(Continued)

*Primary Examiner* — Daniel G Dobson
(74) *Attorney, Agent, or Firm* — Pyprus Pte Ltd; George D. Liu

(57) ABSTRACT

It is therefore an object of the disclosure of this document to attain a data transmission system with a simple transmitter implementing polarization multiplexing using either DML or EAM and a receiver with only one PD. A data transmission system 1 which comprises a transmitter 3 and a receiver 5, wherein the transmitter 3 comprises a first signal processor 11 and an optical signal generator 13, the optical signal generator 13 outputs an optical signal which comprises X and Y polarization components, $e_x(t)$ and $e_y(t)$, and wherein the first signal processor 11 receives a first data stream, $S_x$, and a second data stream, $S_y$, and controls the X and Y polarization components to reflect the first and the second data streams, respectively, wherein the receiver 5 comprises only one photodetector 21 and a second signal processor 23.

4 Claims, 5 Drawing Sheets

(51) Int. Cl.
  *H04B 10/516* (2013.01)
  *H04B 10/66* (2013.01)
  *H04J 14/00* (2006.01)

(56) References Cited

OTHER PUBLICATIONS

Written Opinion of International Patent Application No. PCT/JP2018/003280 completed Apr. 10, 2018 and dated Apr. 24, 2018 (4 pages).
A. Mecozi et al., "Kramers Kronig coherent receiver." Optica. vol. 3, No. 11, p. 1220 (NPL), Nov. 2016.
X. Chen et al., "218-Gb/s single-wavelength, single-polarization, single-photodiode transmission over 125-km of standard singlemode fiber using Kramers-Kronig detection," in OFC (NPL), 2017.
X. Chen et al., "4×240Gb/s Dense WDM and PDM Kramers-Kronig detection with 125-km SSMF transmission," in ECOC (NPL), 2017.
M. Morsy-Osman et al., "1 ramda×224 Gb/s 10km transmission of polarization division mulitiplexed PAM-4 signals using 1.3 micor meter SiP intensity modulator and a direct-detection MIMO-based receiver." in ECOC (NPL), 2014.

* cited by examiner (a)

(b)

a) Transmitter – with linearization b) Transmitter – without linearization

POLARIZATION DIVISION MULTIPLEXING INTENSITY MODULATION SYSTEM AND METHOD USING THE SYSTEM

TECHNICAL FIELD

The invention relates to Polarization Division Multiplexing Intensity Modulation System and Method using the System.

BACKGROUND ART

Current technology for low cost transceivers for intra-datacenter networks and access networks in general is based on intensity-modulation and direct detection. Several possible embodiments of this scheme are shown in FIG. 1 and can shortly described as follows. FIG. 1-a) shows the case of a directly modulated laser (DML) transmission. There, an electrical signal containing the encoded information is fed directly to a laser. As a consequence, the intensity of the light generated by the laser is modulated with a similar information pattern and transmitted through a fiber. Typical transmission wavelengths are around 1.3 micro meter for single-mode fibers. The information pattern may have 2 intensity levels, in which case it is referred as on-off keying or 2-pulse-amplitude modulation (2-PAM) with a capacity of 1 bit per symbol. Alternatively, the information pattern may have more levels of information and currently standardization efforts are ongoing to have 4-PAM with 4 levels of amplitude. This achieves a capacity of 2 bits per symbol at the cost of a lower distance between symbols and worse performance. Detection of the lightwave after transmission is done with a photodetector (PD). This device converts the intensity of incoming light into an electrical current. The electrical current is proportional to the instantaneous power of the lightwave. Therefore it's an approximation of the original electrical signal driving the laser. FIG. 1-b shows an alternative scheme, where the laser is continuously fed, producing a constant amplitude lightwave. This lightwave is then modulated by an external modulator. Typical low-cost transceivers use electro-absorption modulators (EAM) to produce symbols with multiple levels of intensity. This scheme produces signals with a higher quality than the DML alternative shown in FIG. 1-a) by reducing chirp (dynamic frequency fluctuations).

There are two main problems with the conventional approach shown in FIG. 1.

Problem 1. The PD can only detect the intensity of the optical signal at its input and the generated electrical current is proportional to:

$$r(t)=|e(t)|^2 \qquad (1)$$

where e(t) is the complex envelope of the received electrical field, assuming that it is single polarization, and t is time. As such, the receiver has no information about the phase of the optical field. This prevents the compensation of fiber transmission impairments, such as dispersion. This limits the transmission distance significantly when the data rate is increased.

Problem 2. The transmitted signals are single polarization. This wastes the capacity of the transmission fiber, which is capable of supporting two polarization modes. Although dual polarization (DP) signals could be theoretically produced, detection of those signals requires a coherent receiver, which is significantly more complex and costly than a simple PD, which is shown in FIG. 1. Therefore, it is not a viable solution for short reach networks.

The prior art solution to Problem 1 is the use of single-side band (SSB) signals. In particular, the use of SSB signals supported by the Kramers-Kronig relations. These relations state that if the transmitted optical field envelope is encoded in the format:

[Mathematic Formula 1]

$$e(t)=E_0 s(t) \cdot \exp(-j\pi Bt) \qquad (2)$$

where s(t) is the original information signal, $E_0$ is a constant value, and B is a frequency such that the spectrum of s(t) is contained within −B/2 and B/2. This is a standard definition for an SSB signal. However, if the values of $E_0$ and B are chosen appropriately, this can be considered a minimum phase signal [1]. In that case, it's phase, phi (t)=arg[e(t)], and amplitude, |e(t)|, are uniquely related by the Hilbert transform as [1]:

[Mathematic Formula 2]

$$\phi(t) = \frac{1}{\pi} p.v. \int_{-\infty}^{\infty} dt' \frac{\log[|e(t)|]}{t-t'} \qquad (3)$$

This implies that one may recovery the entire information about the optical field envelope by detecting only it's intensity as [1].

[Mathematic Formula 3]

$$s(t)=\{\sqrt{r(t)}\exp[j\phi(t)]-E_0\}\exp(j\pi Bt) \qquad (4)$$

where r(t) is the detected current from the PD, defined by eq. (1) and is defined here as:

[Mathematic Formula 4]

$$r(t)=|E_0+s(t)\cdot\exp(-j\pi Bt)|^2 \qquad (5)$$

This principle gave rise to what is commonly known now as the Kramers-Kronig (KK) receiver [1]. Possible implementations of this receiver are shown in FIG. 2. In the case of FIG. 2-a), the tone is produced in the transmitter side using a MZM modulator (delta f) and transmitted along the fiber along with the signal. This approach has been proposed in [2]. This approach has one major limitation in the sense that it requires modulating the optical field and not just its intensity. For this reason, it requires the use of some form of interferometric modulator, such as a Mach-Zehnder modulator, to generate the tone. Alternatively, the tone may be introduced in the receiver side as a local oscillator, as shown in FIG. 2-b) [3]. In this case, there is a limitation regarding the relative polarizations of the tone and the signal. The scheme requires some form of polarization tracking and alignment mechanism to align the polarizations of the tone and the incoming signal. Furthermore, it requires an additional laser at the receiver side, which may increase the overall cost of the transceiver. Alternatively, there is a polarization diversity version of the receiver, shown in FIG. 3-b), which also addresses problem 2.

There are 2 prior art solutions to Problem 2. The first one involves the use of what are referred as Stokes receivers [4] and the second is based on the Kramer-Kronig receiver [3]. We begin with the stokes receiver. Assume the generation of polarization multiplexed intensity modulated signal, as shown in FIG. 3-a). The light from a laser source is split in two parts, $e_x$ and $e_y$, with each modulated independently by intensity modulators. After modulation, the two components are combined at a polarization combiner. In this case, the electrical field envelope at the polarization combiner output must be represented as a column vector of the form:

[Mathematic Formula 5]

$$\bar{e}(t)=[e_x e_y]^T \quad (6)$$

where the superscript T denotes transposition. Stokes detection of this signal is performed using the scheme shown in FIG. 3-a), where the incoming signal polarizations are split and then follow to a set of detectors and hybrid. This scheme is a combination of coherent and direct detection receivers and allows demultiplexing the two polarizations using digital signal processing (DSP). However, it is a very complex structure. In fact it is nearly as complex than a conventional coherent receiver and requires 6 PDs, which could be reduced to 5 PDs using an alternative hybrid structure (as a note, a coherent receiver would require 8 PDs).

The second alternative for polarization demultiplexing uses the scheme shown in FIG. 3-b). In this case, the incoming signal is split into its polarization components and mixed with a local oscillator to reach the minimum phase condition of the KK receivers [3]. Afterwards two PDs are used to receive the field on each polarization. After the detectors, DSP is used for polarization demultiplexing. This scheme has the same limitations as the KK receiver described to handle problem 1. Furthermore, it requires the use of two photodetectors and a polarization beam splitter at the receiver.

CITATION LIST

Non Patent Literature

[NPTL 1] A. Mecozzi, C. Antonelli, and M. Shtaif, "Kramers Kronig coherent receiver," Optica, vol. 3, no. 11, p. 1220, November 2016.

[NPTL 2] X. Chen et al., "218-Gb/s single-wavelength, single-polarization, single-photodiode transmission over 125-km of standard singlemode fiber using Kramers-Kronig detection," in OFC, 2017, p. Th5B-6.

[NPTL 3] X. Chen et al, "4×240 Gb/s Dense WDM and PDM Kramers-Kronig detection with 125-km SSMF transmission," in ECOC, 2017.

[NPTL 4] M. Morsy-Osman et al., "1 ramda×224 Gb/s 10 km transmission of polarization division multiplexed PAM-4 signals using 1.3 micor meter SiP intensity modulator and a direct-detection MIMO-based receiver," in ECOC, 2014, pp. 1-3.

SUMMARY OF INVENTION

Technical Problem

After establishing the prior art, it is clear that the desirable conditions for low-cost access network transceiver can be listed as:

1. Integrated transmitter using either DML or EAM
2. Simple receiver using a single PD All the cases listed in the prior art fail to achieve these conditions requiring either complex interferometric transmitters; complex receivers with hybrids, which are difficult to integrate; and/or a large number of PDs on the receivers, in order to increase the capacity by means of polarization multiplexing.

It is therefore an object of the disclosure of this document to attain a data transmission system with a simple transmitter implementing polarization multiplexing using either DML or EAM and a receiver with only one PD.

Solution to Problem

The proposed scheme herein allows implementing polarization multiplexing using either DML or EAM at the transmitter side and a single PD at the receiver side. The proposed system consists of the transmission setup electronic and optical functions as well as the receiver DSP.

The first aspect of the disclosure of this document relates to a data transmission system.

The data transmission system 1 comprises a transmitter 3 and a receiver 5.

The transmitter 3 comprises a first signal processor 11 and an optical signal generator 13.

The optical signal generator 13 outputs an optical signal which comprises X and Y polarization components, $e_x(t)$ and $e_y(t)$.

The first signal processor 11 receives a first data stream, $S_x$, and a second data stream, $S_y$, and controls the X and Y polarization components of the optical signal to reflect the first and the second data streams, $S_x$ and $S_y$, respectively.

The receiver 5 comprises only one photodetector 21 and a second signal processor 23.

The preferred embodiment of the data transmission system 1 is that the first signal processor 11 comprises an oscillator 25. Further the first signal processor 11 controls X and Y polarization components using the following equation (I).

[Mathematic Formula 6]

$$e(t)=E_0+[s_x(t)+js_y(t)]\cdot\exp(-j\pi Bt) \quad (I)$$

In the equation (I), e(t) represents the optical signal, $E_0$ is constant level component of the optical signal, the $s_x(t)$ is a signal in the first data stream transported over the X polarization component, the $s_y(t)$ is a signal in the second data stream transported over the Y polarization component, B is a frequency of the oscillator 25 and j is $(-1)^{1/2}$.

The preferred embodiment of the data transmission system 1 is that the first signal processor 11 controls X and Y polarization components, $e_x(t)$ and $e_y(t)$, to be $(\text{Re }(e(t)))^2$ and $(\text{Im}(e(t)))^2$, respectively. The e(t) is defined in the equation (I), the Re (e(t)) is a real part of the e(t) and the Im(e(t)) is an imaginary pat of the e(t).

The preferred embodiment of the data transmission system 1 is that the first signal processor 11 controls X and Y polarization components, $e_x(t)$ and $e_y(t)$, to be Re (e(t)) and Im(e(t)), respectively. The e(t) is defined in the equation (I), the Re (e(t)) is a real part of the e(t) and the Im(e(t)) is an imaginary pat of the e(t). The receiver 5 may comprise a linearizer.

The second aspect of the disclosure of this document relates to a method for transmitting data comprising the steps of:

receiving a first data stream, $S_x$ and a second data stream, $S_y$, by a first signal processor 11, controlling an output signal output from an optical signal generator 13 by the first signal processor 11 such that X and Y polarization components, $e_x(t)$ and $e_y(t)$, of the output signal to reflect the first and the second data streams, respectively, receiving the output signal by only one photodetector 21, and reconstructing the first data stream, $S_x$ and the second data stream, $S_y$, by a second signal processor 23 using the output signal.

DESCRIPTION OF EMBODIMENTS

The first aspect of the disclosure of this document relates to a data transmission system. The system may relate to Polarization Division Multiplexing Intensity Modulation System. The system of the transmitter may transmit optical Polarization Division Multiplexing Intensity Modulation signal.

Constrains for PON (Passive Optical Network), GPON (Gigabit capable Passive Optical Network) and EPON (Ethernet Passive Optical Network) are listed as follows. For OLT (Optical Line Terminal), Cost of components can be shared by number of users; Next generation 100G EPON foresees the use of optical amplifiers; 25 Gb/s signals using 25 GHz hardware from datacenters or legacy 10 GHz Hardware; and Externally modulated lasers (EML) are acceptable.

For ONU (Optical Network Unit), Cost of components is critical; No optical amplification is foreseen. However, OLT may have pre-amplifier; 25 Gb/s signals using either 25 GHz hardware from datacenters; and Directly modulated lasers are preferred.

Figure 1:
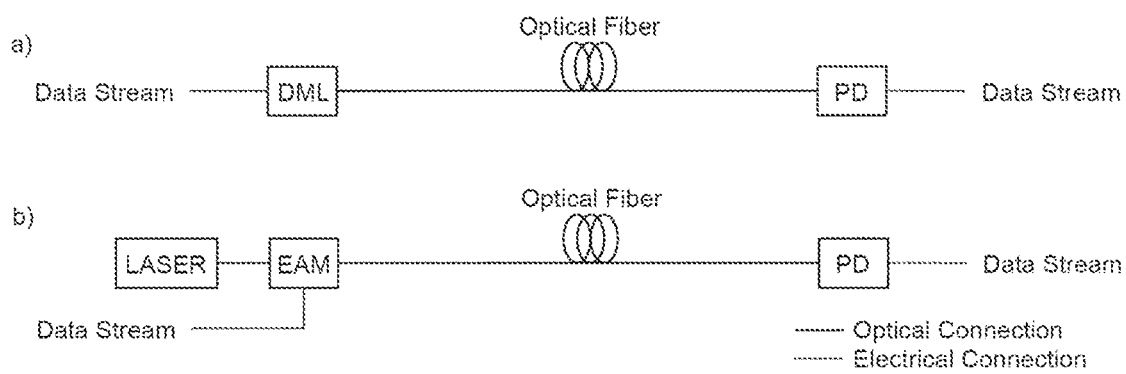
FIG. 1 shows Typical transmission schemes for intensity-modulation and direct detection (IM-DD) using (a) a directly modulated laser (DML) and (b) a continuous waveform laser followed by an electro-absorption modulator (EAM)
Figure 2:
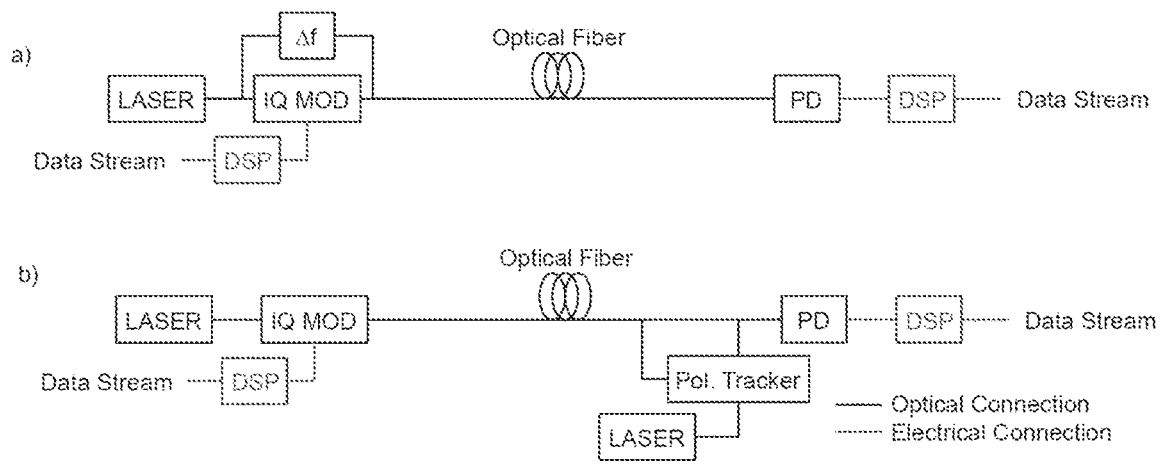
FIG. 2 shows Single-polarization implementations of the coherent Kramers-Kronig receiver with (a) tone inserted at the transmitter and (b) tone introduced as a local oscillator at the receiver.
Figure 3:
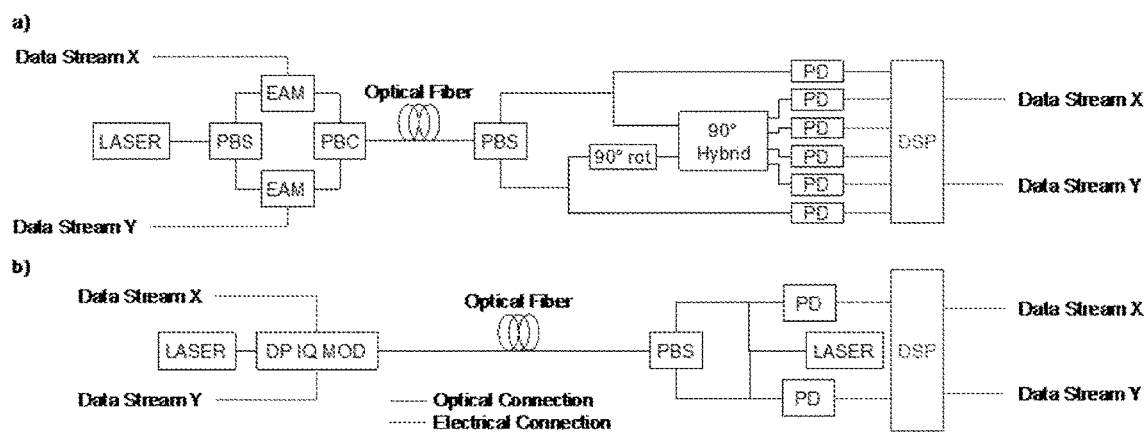
FIG. 3 shows polarization multiplexing schemes supporting direct detection based on (a) Stokes receiver, and (b) Kramer-Kronigs receiver.
Figure 4:
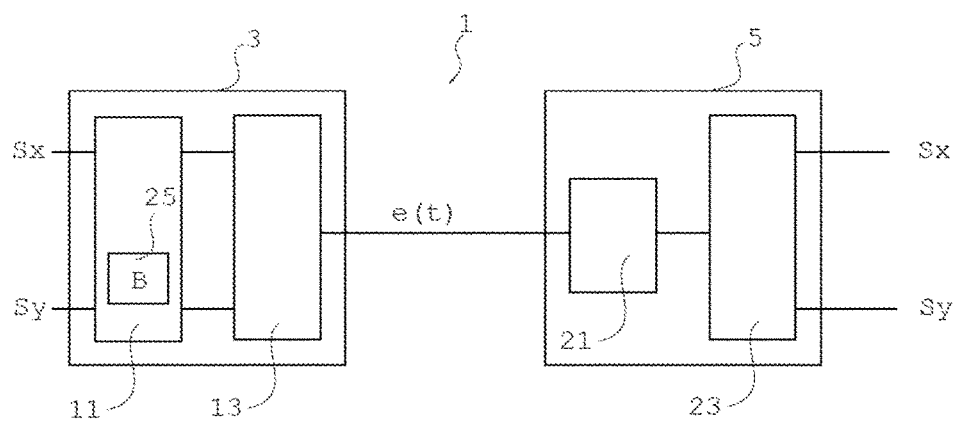
FIG. 4 shows a diagram of the data transmission system.

FIG. 4 shows a diagram of the data transmission system. As shown in FIG. 4, the data transmission system 1 comprises a transmitter 3 and a receiver 5. The transmitter 3 comprises a first signal processor 11 and an optical signal generator 13. The optical signal generator 13 outputs an optical signal which comprises X and Y polarization components, $e_x(t)$ and $e_y(t)$. The first signal processor 11 receives a first data stream, $S_x$, and a second data stream, $S_y$, and controls the X and Y polarization components of the optical signal to reflect the first and the second data streams, $S_x$ and $S_y$, respectively. It is preferred for the transmitter to comprise only one or plurality of directly modulated lasers (DML) or one or plurality of electro-absorption modulators (EAM) as modulators. The DML or EAM executes Intensity Modulation and the signal processor may control the polarization division multiplexing.

Figure 5:
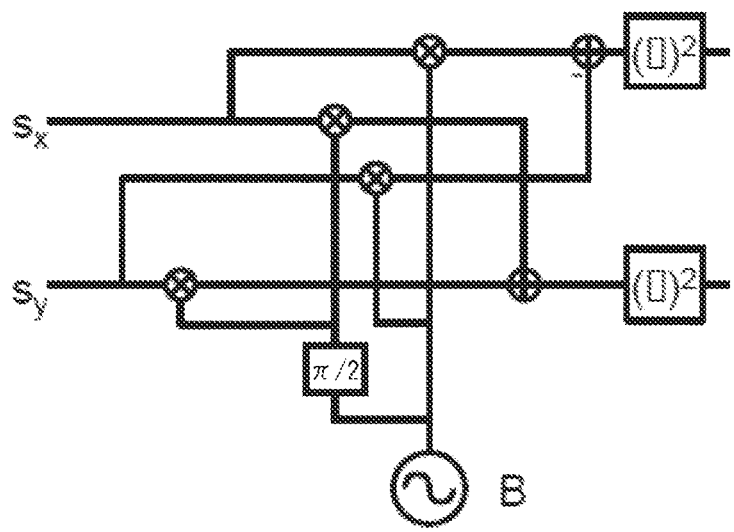
FIG. 5 shows examples of the first signal processor.
Figure 5:
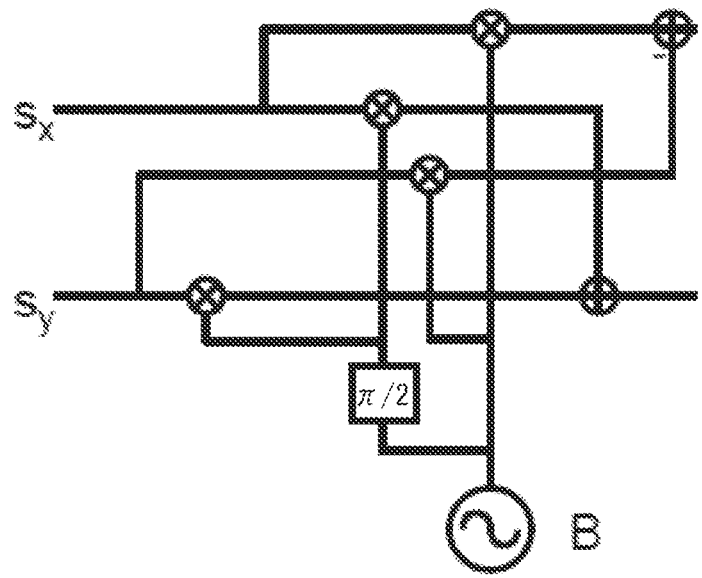

FIG. 5 shows examples of the first signal processor. FIG. 5(a) shows the signal processor that contains linearizers. The circuits may be implemented by hardware resources and combination of software and hardware resources. When the transmitter is implemented by means of software and hardware resources, the role of each elements may be realized by a computer program. The linearizer is depicted in the figure as ( )². Examples of the linearizers are disclosed in JP Patent Nos. 5505082 and 5834804. In the figure pi/2 circuit provides phase difference. The signal generator 13 may comprise only one or plurality of directly modulated lasers (DML) or one or plurality of electro-absorption modulators (EAM) as modulators. B stands for frequency of the oscillator. The role of the circuit depicted in FIG. 5(a) and FIG. 5(b) is easy to understand by tracing signs.

Optical Signal output from the transmitter is represented by

[Mathematic Formula 7]

$$\overline{e}(t)=[e_x, e_y]^T$$

wherein $e_x$ and $e_y$ represent X and Y polarization components of the optical signal, respectively.

Figure 6:
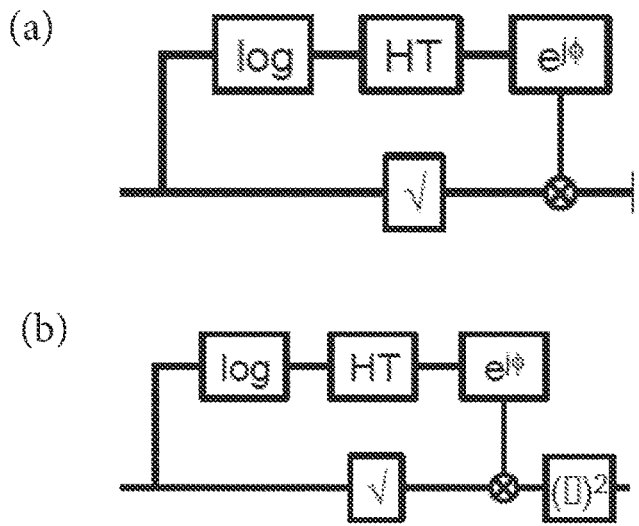
FIG. 6 shows examples of the second signal processor.

The receiver 5 comprises only one photodetector 21 and a second signal processor 23. FIG. 6 shows examples of the second signal processor. FIG. 6(a) shows the signal processor which contains a route circuit, a log circuit, a HT, Hilbert transform, circuit, and an $e^{phai}$ circuit. FIG. 6(b) shows the signal processor which further contains a linearizer. The circuits may be implemented by hardware resources and combination of software and hardware resources.

The second signal processor reflects components of the conventional KK receiver that realizes following equations.

[Mathematic Formula 8]

$$E_s(t) = \left\{\sqrt{I(t)} \exp[i\phi_E(t)] - E_0\right\}\exp(i\pi Bt),$$

$$\phi_E(t) = \frac{1}{2\pi} p.v. \int_{-\infty}^{\infty} dt' \frac{\log[I(t')]}{t - t'}.$$

The second signal processor analyses the output electric signal output from the PD by applying equation (I) and revives the information of the first and second data stream $S_x$ and $S_y$.

The preferred embodiment of the data transmission system 1 is that the first signal processor 11 comprises an oscillator 25 or a linearizer. Further the first signal processor 11 controls X and Y polarization components using the following equation (I).

[Mathematic Formula 9]

$$e(t)=E_0\pm[s_x(t)js_y(t)]\cdot\exp(-j\pi Bt) \quad (I)$$

(in the equation (I), e(t) represents the optical signal, $E_0$ is constant level component of the optical signal, the $s_x(t)$ is a signal in the first data stream transported over the X polarization component, the $s_y(t)$ is a signal in the second data stream transported over the Y polarization component, B is a frequency of the oscillator 25 and j is $(-1)^{1/2}$.) The above is attained by means of the signal processor depicted in FIG. 5.

The preferred embodiment of the data transmission system 1 is that the first signal processor 11 controls X and Y polarization components, $e_x(t)$ and $e_y(t)$, to be $(Re\ (e(t)))^2$ and $(Im(e(t)))^2$, respectively. The e(t) is defined in the equation (I), the Re (e(t)) is a real part of the e(t) and the Im(e(t)) is an imaginary part of the e(t).

The preferred embodiment of the data transmission system 1 is that the first signal processor 11 controls X and Y polarization components, $e_x(t)$ and $e_y(t)$, to be Re (e(t)) and Im(e(t)), respectively. The e(t) is defined in the equation (I), the Re (e(t)) is a real part of the e(t) and the Im(e(t)) is an imaginary pat of the e(t). The receiver 5 may comprise a linearizer.

The second aspect of the disclosure of this document relates to a method for transmitting data. The first signal processor 11 of the transmitter 3 receives a first data stream, $S_x$, and a second data stream, $S_y$. The first signal processor 11 controls the data applied to optical signals such that the output signal output from the optical signal generator 13 to have X and Y polarization components, $e_x(t)$ and $e_y(t)$, that reflect the first and the second data streams, respectively. Then the output signal is transmitted through, e.g., optical fiber, to the receiver 5. The output signal may be a modulated signal such as SSB, single sideband, signal. The single photodetector 21 receives the output signal output from the optical signal generator 13. The second signal processor 23 reconstructs the first data stream, $S_x$ and the second data stream, $S_y$, by using electric signal output from the photodetector 21.

Detailed System

Figure 7:
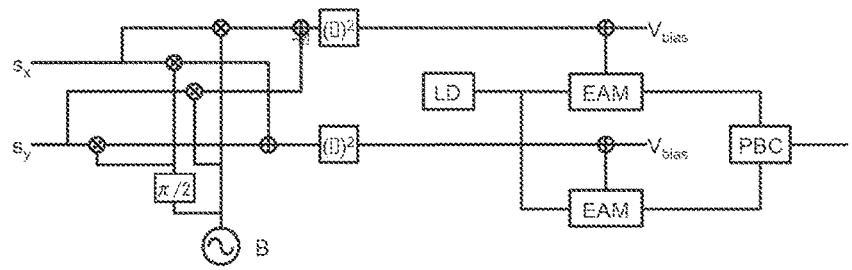
FIG. 7. Schemes for ideal PDM-IM-DD receiver using upconversion with (a) electrical linearization, and (b) optical linearization. Sub-figure (c) presents the receiver scheme using linearized signals. When not using linearized signals, the receiver shown in (d) allows smaller distortion.
Figure 7:
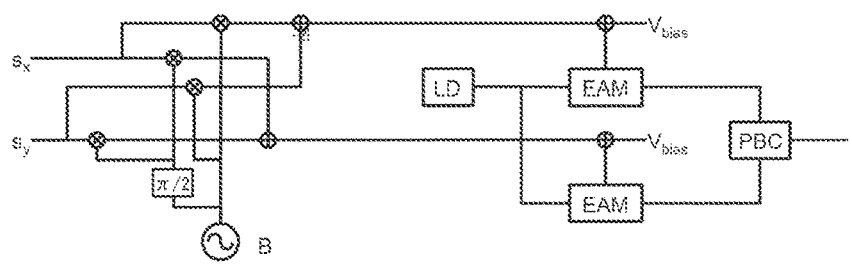
Figure 7:
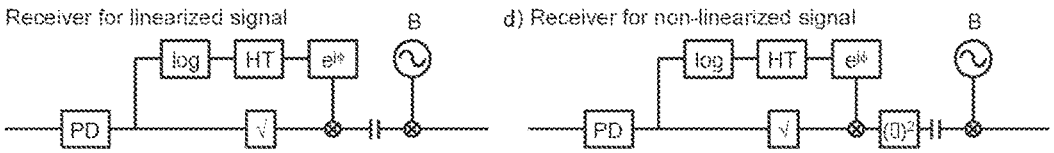

This is potentially the lowest cost structure for polarization multiplexing of intensity-modulated direct detection systems proposed so far. FIG. 7 shows diagrams of the optical scheme using EAM. The total number of components is significantly smaller than any previous prior art and it complies with integration requirements by using DML or EAM and a single PD at the receiver side.

In the FIG. 7, the optical signal generator 13 comprises a single LD, laser diode, as a light source and comprises two EAMs, electro-absorption modulators. It is possible to replace them with two DMLs. The bias voltages are applied to the EAMs. The two signals output from the signal generator 11 are applied to the two EAMs. The signals output from the two EAMs are input into the PBS, polarized beam splitter. The PBS outputs the signal which is transmitted to the receiver side.

To describe this invention, we begin by writing the squared-law detection rule expressed by (1) for single polarization signals for the case of signals with two polarization components as:

[Mathematic Formula 10]

$$r(t)=|e_x(t)|^2+|e_y(t)|^2 \quad (7)$$

where $e_x$ and $e_y$ are the complex envelopes of the received dual-polarization signal. Equation (7) is a well known result but we can write it in a novel way:

[Mathematic Formula 11]

$$r(t)=|e'(t)|^2 \quad (8)$$

where e'(t) is an abstract complex quantity such that:

[Mathematic Formula 12]

$$\text{Re}\{e'(t)\}=|e_x(t)|^2$$

$$\text{Im}\{e'(t)\}=|e_y(t)|^2 \quad (9)$$

So now, if we assume that e'(t) has the same form as equation (2), we have the conditions to implement a KK receiver. However, instead of assuming that the KK receiver is operating to detect the real and imaginary parts of the received signal, our invention assumes that it is detecting the X and Y polarization components. Effectively, we have changed the media used to represent the real and imaginary parts from the complex domain to the polarization domain. This is the first innovative step of this invention: to characterize the KK fundamental principles in polarization instead of quadrature. Now it is possible to detect this signal using the principles of the KK receiver assuming that e'(t) follows the condition of a minimum phase signal.

To generate the signal e'(t) we assume following form:

1. Upconverted signal, where the signal takes the form:

[Mathematic Formula 13]

$$e(t)=E_0+[s_x(t)+js_y(t)]\cdot\exp(-j\pi Bt) \quad (I)$$

This form is similar equation (2) with $s_x$ and $s_y$ as the signals transported over the X and Y polarizations, respectively. To generate this signal, consider the scheme presented in FIG. 7-a). This implements the computation of the components of the optical signals transported over the X and Y polarizations. Note that the minimum bandwidth of the signals driving the modulator is B. However, the optical modulators may be biased to have the optical intensity linear with the driving voltage. In our system, it is desirable to have the optical field linear with the driving voltage. Therefore, electrical linearization of the drive signals may be required. In this case, we need to transform the driving signals into their squares, which increases the required bandwidth to 2B. To prevent this problem, we may bias the modulator in a nonlinear section of its characteristic in such a way that the generated optical field already contains the nonlinearity, as shown in FIG. 7-b). FIG. 7-c) presents the receiver, which includes Hilbert transform (HT) and downconversion. Alternatively, we can use non-linearized signals. This provides a simpler implementation of the transmitter and receiver. However, the distortion resulting from the nonlinearization may degrade the signal. To handle this distortion, we may include a linearization module on the receiver, as shown in FIG. 7-d).

2. Simplified Upconverted Signals

In this case, we simplify the upconversion process of form 1 by assuming a signal of the form:

[Mathematic Formula 14]

$$e(t)=E_0+s_x(t)\cdot\cos(\pi Bt)+js_y(t)\cdot\sin(\pi Bt) \quad (II)$$

Figure 8:
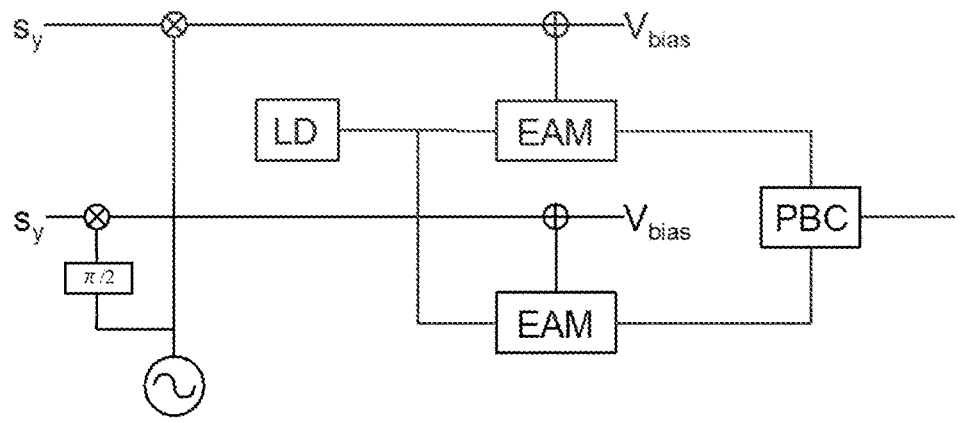
FIG. 8 shows Schemes for simplified PDM-IM-DD receiver using upconverted signals with linearization (a) and without linearization (b).
Figure 8:
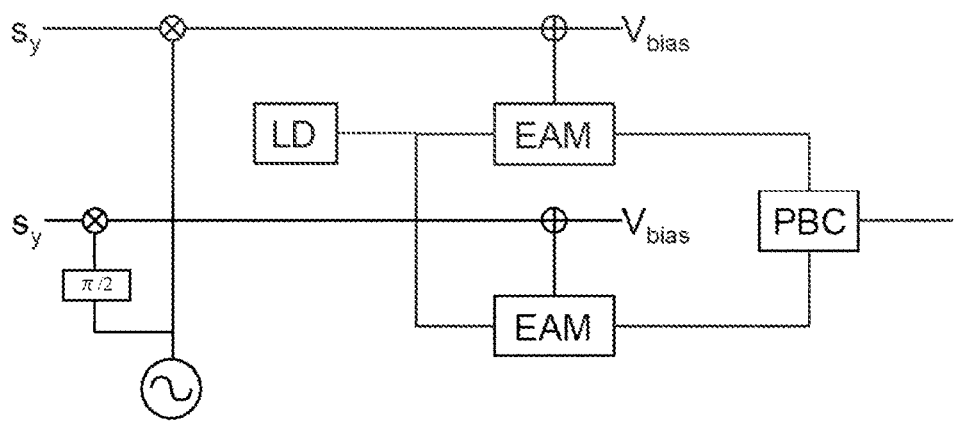

This reduces the number of upconversions required to generate the X and Y polarization signals but introduces some distortion. Given the benefits of simplifying the setup, this distortion may be acceptable. FIG. 8-a) and FIG. 8-b) present the possible schemes with or without linearization. These schemes should use the receivers described in FIGS. 7-c) and A4-d), respectively.

The invention claimed is:

1. A data transmission system (1) which comprises a transmitter (3) and a receiver (5),
    wherein the transmitter (3) comprises a first signal processor (11) and an optical signal generator (13),
    the optical signal generator (13) outputs an optical signal which comprises X and Y polarization components, $e_x(t)$ and $e_y(t)$, and
    wherein the first signal processor (11) receives a first data stream, $S_x$, and a second data stream, $S_y$, and controls the X and Y polarization components to reflect the first and the second data streams, respectively,
    wherein the receiver (5) comprises only one photodetector (21) and a second signal processor (23);
    wherein the first signal processor (11) comprises an oscillator (25), and
    wherein the first signal processor (11) controls X and Y polarization components using the following equation (I), $$e(t)=E_0+[s_x(t)+jS_y(t)]\cdot\exp(-j\pi Bt) \quad (I)$$

(in the equation (I), e(t) represents the optical signal, $E_0$ is constant level component of the optical signal, the $s_x(t)$ is a signal in the first data stream transported over the X polarization component, the $s_y(t)$ is a signal in the second data stream transported over the Y polarization component, B is a frequency of the oscillator (25) and j is $(-1)^{1/2}$.

2. The data transmission system (1) in accordance with claim 1,
wherein the first signal processor (11) controls X and Y polarization components, $e_x(t)$ and $e_y(t)$, to be (Re $(e(t)))^2$ and $(Im(e(t)))^2$, respectively, and
wherein the e(t) is defined in the equation (I), the Re (e(t)) is a real part of the e(t) and the Im(e(t)) is an imaginary pat of the e(t).

3. The data transmission system (1) in accordance with claim 1,
wherein the first signal processor (11) controls X and Y polarization components, $e_x(t)$ and $e_y(t)$, to be Re (e(t)) and Im(e(t)), respectively,
wherein the e(t) is defined in the equation (I), the Re (e(t)) is a real part of the e(t) and the Im(e(t)) is an imaginary pat of the e(t),
wherein the receiver (5) comprises a linearizer.

4. A method for transmitting data comprising the steps of:
receiving a first data stream, $S_x$ and a second data stream, $S_y$, by a first signal processor (11),
controlling an output signal output from an optical signal generator (13) by the first signal processor (11) such that X and Y polarization components, $e_x(t)$ and $e_y(t)$, of the output signal to reflect the first and the second data streams, respectively,
receiving the output signal by only one photodetector (21), and
reconstructing the first data stream, $S_x$ and the second data stream, $S_y$, by a second signal processor (23) using the output signal;
wherein the first signal processor (11) comprises an oscillator (25), and
wherein the first signal processor (11) controls X and Y polarization components using the following equation (I), $$e(t)=E_0+[s_x(t)+jS_y(t)]\cdot \exp(-j\pi Bt) \quad (I)$$

(in the equation (I), e(t) represents the optical signal, $E_0$ is constant level component of the optical signal, the $s_x(t)$ is a signal in the first data stream transported over the X polarization component, the $s_y(t)$ is a signal in the second data stream transported over the Y polarization component, B is a frequency of the oscillator (25) and j is $(-1)^{1/2}$.

\* \* \* \* \*